(12) United States Patent
Hatano et al.

(10) Patent No.: US 6,893,767 B2
(45) Date of Patent: May 17, 2005

(54) METHODS FOR PRODUCING FUEL CELL UNITS AND FUEL CELL STACKS

(75) Inventors: Harumi Hatano, Utsunomiya (JP); Nobuaki Kimura, Atsugi (JP); Masajiro Inoue, Shioya-gun (JP); Hiroyuki Tanaka, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 509 days.

(21) Appl. No.: 10/073,696

(22) Filed: Feb. 11, 2002

(65) Prior Publication Data

US 2002/0110721 A1 Aug. 15, 2002

(30) Foreign Application Priority Data

Feb. 14, 2001 (JP) .................................... P2001-037373

(51) Int. Cl.[7] .......................... H01M 2/00; H01M 2/02; H01M 2/08; H01M 6/00
(52) U.S. Cl. ......................... 429/37; 429/34; 429/35; 429/36; 29/623.2; 29/623.3; 29/623.5; 29/730
(58) Field of Search ...................... 429/30, 34, 35, 429/39, 37, 36; 29/623.2, 623.3, 623.4, 623.5, 730

(56) References Cited

U.S. PATENT DOCUMENTS

| | | | | |
|---|---|---|---|---|
| 5,336,570 A | * | 8/1994 | Dodge, Jr. | 429/31 |
| 5,458,989 A | * | 10/1995 | Dodge | 429/31 |
| 5,464,700 A | * | 11/1995 | Steck et al. | 429/30 |
| 5,509,942 A | * | 4/1996 | Dodge | 29/623.2 |
| 6,699,613 B2 | * | 3/2004 | Inoue et al. | 429/35 |

FOREIGN PATENT DOCUMENTS

JP            07-249417            9/1995

* cited by examiner

Primary Examiner—Bruce F. Bell
Assistant Examiner—Robert Hodge
(74) Attorney, Agent, or Firm—Lahive & Cockfield, LLP; Anthony A. Laurentano, Esq

(57) ABSTRACT

A method for producing a fuel cell unit including a membrane electrode assembly formed by a solid polymer electrolyte membrane and a pair of electrodes located at both sides of the solid polymer electrolyte membrane, and a pair of separators which hold the membrane electrode assembly. The method includes the steps of applying liquid sealant to one of a marginal portion of the solid polymer electrolyte membrane, the marginal portion being not covered by the pair of electrodes when assembled, and a surface of each of the pair of separators, the surface corresponding to the marginal portion of the solid polymer electrolyte membrane; holding the solid polymer electrolyte membrane with the pair of separators to perform temporary assembling; and solidifying the liquid sealant while maintaining a temporary assembling state.

20 Claims, 8 Drawing Sheets

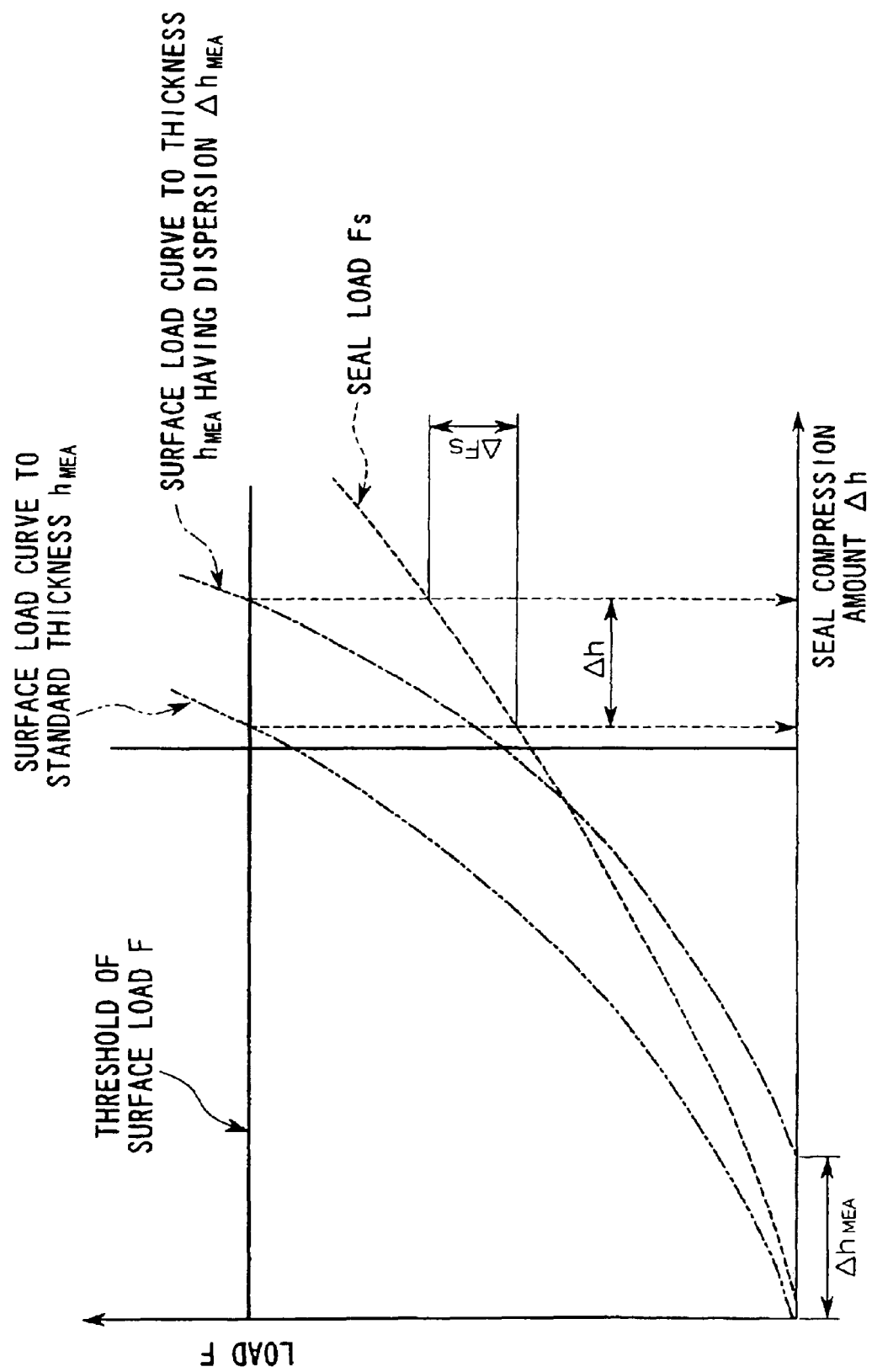

ns and Fuel Cell Stacks

METHODS FOR PRODUCING FUEL CELL UNITS AND FUEL CELL STACKS

BACKGROUND OF THE INVENTION

1. Field of the Invention

The present invention relates to methods for producing fuel cell units and for producing fuel cell stacks. More specifically, the present invention relates to a method for producing a fuel cell unit which is formed by a membrane electrode assembly (MEA) including a solid polymer electrolyte membrane held by a pair of electrodes, the outside of the membrane electrode assembly being held by a pair of separators, and to a method for producing a fuel cell stack which is formed by stacking a plurality of the fuel cell units. In particular, the present invention relates to a technique by which tightening margin at a sealing portion in the membrane electrode assembly may be made constant without being influenced by the non-uniformity in the thickness of the membrane electrode assembly.

2. Description of Related Art

In conventional solid polymer type fuel cell units, a solid polymer electrolyte membrane, which functions as a cation exchange membrane, is sandwiched by a pair of electrodes, and the outside of each of the electrodes is held by a pair of separators.

Generally, a certain number of the fuel cell units having the above-mentioned structure are stacked and used as a fuel cell stack.

FIG. 11 is a diagram showing an enlarged cross-sectional view of main parts of an example of the fuel cell unit.

In the fuel cell unit 1 shown in FIG. 11, a passage 4 for an oxidant gas (for instance, air including oxygen) is provided on a surface of a cathode side separator 3a which is disposed so as to face a cathode 2a.

On the other hand, a passage 5 for a fuel gas (for instance, hydrogen) is provided on a surface of an anode side separator 3b, which is disposed as to face an anode 2b, and a passage 6 for a cooling medium (for instance, water or ethylene glycol) is provided on the other surface of the anode side separator 3b.

Since it is necessary that the oxidant gas, the fuel gas, (hereinafter these gases may be abbreviated as "reaction gas(es)", and the cooling medium be independently passed through the passages 4–6, respectively, the technique used for sealing between each of the passages 4–6 becomes important.

Examples of portions to be sealed include in the vicinity of a communication hole (not shown in the figure) which penetrates through the separators 3a and 3b in order to distribute and supply the reaction gases and the cooling medium to each of the fuel cell units 1, an outer periphery of a membrane electrode assembly 8 formed by a solid polymer electrolyte membrane 7 and the electrodes 2a and 2b disposed so as to sandwich the solid polymer electrolyte membrane 7, an outer periphery of a cooling medium passage of the separators 3a and 3b, and an outer periphery of the both sides of the separators 3a and 3b.

As a sealing technique used for the fuel cell unit 1 and the fuel cell stack, one is known in which a solid seal 9 made of a soft material having a suitable resilience, such as an organic rubber, is disposed at sealing portions, and a load is applied to the solid seal 9 in a stacking direction (i.e., the longitudinal direction in FIG. 11) to compress the solid seal 9 so that the sealing portions are sealed using the surface pressure generated thereby.

In the above-mentioned technique, the seal compression amount Δh, which is the tightening margin for the solid seal 9, may be defined by the following formula:

$$\Delta h = \Delta h1 + \Delta h2 \quad (1)$$

$$\Delta h1 = h\text{seal} - h\text{MEA} \quad (2)$$

hseal: the height of the solid seal 9;
hMEA: the thickness of the membrane electrode assembly 8; and
Δh2: the compression amount of the membrane electrode assembly 8 when load is applied.

Here, at each stacking surface of the fuel cell stack, it is necessary that the surface pressure, which is sufficient for an appropriate contact in or between the fuel cell unit(s) 1, be applied in order to suppress the increase in the internal resistance or the contact resistance of the fuel cell unit 1.

However, as it is clear from the above formulae of (1) and (2), if the thickness hMEA of each of the membrane electrode assembly 8 is not uniform, the non-uniformity ΔhMEA is directly reflected to the seal compression amount Δh, which is the lightening margin for the solid seal 9.

As shown in the graph of FIG. 12, the seal compression amount Δh may be expressed by the distance between points of intersection, which are present on the threshold value of a surface load F of the membrane electrode assembly 8 required for obtaining the above-mentioned degree of the surface pressure, formed by the surface load curve (expressed by a two-dotted line in the graph) of the membrane electrode assembly 8 having a predetermined thickness hMEA (hereinafter referred to as "a standard thickness"), and by the surface load curve (expressed by a one-dotted line in the graph) of the membrane electrode assembly 8 having a thickness hMEA which is different from the predetermined thickness hMEA by ΔhMEA. Accordingly, if the non-uniformity ΔhMEA is directly reflected on the seal compression amount Δh, the non-uniformity ΔFs of the seal load Fs (expressed by a dashed line in the graph) is also increased.

Also, if the thickness hMEA is not uniform in in-phase directions of the same membrane electrode assembly 8, the seal surface pressure which acts on the solid seal 9, which in turn acts on the sealing portions, and on the separators 3a and 3b and the membrane electrode assembly 8, is also made non-uniform. Accordingly, the power generation performance of the fuel cell may decrease due to the deterioration of the sealing property, and the fuel cell unit 1 may be bent and deformed due to the non-uniformity in the surface load between the fuel cell units 1.

Although the generation of the bent-deformation may be prevented by increasing the thickness of the separators 3a and 3b, the resultant fuel cell is not suitable for mounting on a vehicle, for instance, since the size and the weight of the fuel cell stack are increased.

Other than the technique relating to the solid seal 9 described above, as a sealing technique relating to the fuel cell unit 1 and the fuel cell stack, one is known in which an adhesive, etc., is filled in a sealing portion in a load applied state in the stacking direction and the sealing portion is sealed by using the adhesive strength at boundary surfaces as disclosed in, for example. Japanese Unexamined Patent Application, First Publication No. Hei 7-249417.

However, in the above technique relating to the adhesive seal, there are problems, such as a low reliablity in the durability of the adhesive strength at the boundary surfaces.

SUMMARY OF THE INVENTION

The present invention takes into consideration the above-mentioned circumstances, and has an a object to provide methods for producing fuel cell units and for producing fuel cell stacks by which tightening margin at a sealing portion in a membrane electrode assembly may be made constant without being influenced by the non-uniformity in the thickness of the membrane electrode assembly if such a non-uniformity is present. The other objects and features of the invention will be understood from the following description with reference to the accompany drawings.

Accordingly, the present invention provides a method for producing a fuel cell unit (for instances, a fuel cell unit 10 in embodiments described below) including a membrane electrode assembly (for instance, a membrane electrode assembly 12 in the embodiments described below) formed by a solid polymer electrolyte membrane (for instance, a solid polymer electrolyte membrane 18 in the embodiments described below) and a pair of electrodes (for instance, a cathode 25 and an anode 27 in the embodiments described below) located at both sides of the solid polymer electrolyte membrane, and a pair of separators (for instance, a cathode side separator 14 and an anode side separator 16 in the embodiments described below) which hold the membrane electrode assembly, comprising the steps of: applying liquid sealant to at least one of a marginal portion (for instance, a marginal portion 18a in the embodiments described below) of the solid polymer electrolyte membrane, the marginal portion being not covered by the pair of electrodes when assembled, and a surface (for instance, a groove portion 28 in the embodiments described below) of each of the pair of separators, the surface corresponding to the marginal portion of the solid polymer electrolyte membrane; holding the solid polymer electrolyte membrane with the pair of separators to perform temporary assembling; and solidifying the liquid sealant while maintaining a temporary assembling state (i.e., steps shown in, for instances, FIG. 3 through 6 in the embodiments described below).

According to the method described above, since the liquid sealant applied onto the sealing portion is squeezed during the temporary assembly step and thereby absorbing or eliminating the non-uniformity in the thickness of the membrane electrode assembly, the compression amount of the liquid sealant, i.e., the tightening margin, at the sealing portion is made constant, if the liquid sealant is solidified in that state, even when the thickness of the membrane electrode assembly is not uniform in the in-plane direction or in each of the membrane electrode assembly.

The present invention also provides a method for producing a fuel cell stack having a plurality of stacked fuel cell units (for instance, a fuel cell unit 10 in the embodiments described below) including a membrane electrode assembly (for instance, a membrane electrode assembly 12 in the embodiments described below) formed by a solid polymer electrolyte membrane (for instance, a solid polymer electrolyte membrane 18 in the embodiments described below) and a pair of electrodes (for instances, a cathode 25 and an anode 27 in the embodiments described below) located at both sides of the solid separator 14 and an anode side separator 16 in the embodiments described below) which hold the membrane electrode assembly, comprising the steps of: applying liquid sealant to at least one of a marginal portion (for instance, a marginal portion 18a in the embodiments described below) of the solid polymer electrolyte membrane, the marginal portion being not covered by the pair of electrodes when assembled, and a surface (for instance, a groove portion 28 in the embodiments described below) of the each of the pair of separators, the surface corresponding to the marginal portion of the solid polymer electrolyte membrane; holding the solid polymer electrolyte membrane with the pair of separators to perform temporary assembling; solidifying the liquid sealant while maintaining a temporary assembling state (i.e., steps shown in, for instance, FIG. 3 through 6 in the embodiments described below) to obtain a fuel cell unit; stacking a predetermined number of the fuel cell units so as to be placed between a pair of end plates (for instance, end plates 90 in the embodiments described below), and applying a compression load in a direction reducing the distance between the end plates to produce a fuel cell stack (i.e., steps shown in, for instance, FIGS. 7 through 9 in the embodiments described below).

According to the method described above, since the liquid sealant applied onto the sealing portion in the process of obtaining the fuel cell unit is squeezed during the temporary assembly step and thereby absorbing or eliminating the non-uniformity in the thickness of the membrane electrode assembly, the compression amount of the liquid sealant, i.e., the tightening margin, at each of the sealing portion is also made constant when a predetermined number of the obtained fuel cell units is stacked and the compression load is applied in the stacking direction to produce a fuel cell stack.

The present invention also provides a fuel cell unit (for instance, a fuel cell unit 10 in embodiments described below) including a membrane electrode assembly (for instance, a membrane electrode assembly 12 in the embodiments described below) formed by a solid polymer electrolyte membrane (for instance, a solid polymer electrolyte membrane 18 in the embodiments described below) and a pair of electrodes (for instance, a cathode 25 and an anode 27 in the embodiments described below) located at both sides of the solid polymer electrolyte membrane, and a pair of separators (for instance, a cathode side separator 14 and an anode side separator 16 in the embodiments described below) which hold the membrane electrode assembly, obtained by the process comprising the steps of: applying liquid sealant to at least one of a marginal portion (for instance, a marginal portion 18a in the embodiments described below) of the solid polymer electrolyte membrane, the marginal portion being not covered by the pair of electrodes when assembled, and a surface (for instance, a groove portion 28 in the embodiments described below) of each of the pair of separators, the surface corresponding to the marginal portion of the solid polymer electrolyte membrane; holding the solid polymer electrolyte membrane with the pair of separators to perform temporary assembling; and solidifying the liquid sealant while maintaining a temporary assembling state (i.e., steps shown in, for instance, FIGS. 3 through 6 in the embodiments described below).

The present invention also provides a fuel cell stack having a plurality of stacked fuel cell units (for instance, a fuel cell unit 10 in the embodiments described below) including a membrane electrode assembly (for instance, a membrane electrode assembly 12 in the embodiments described below) formed by a solid polymer electrolyte membrane (for instance, a solid polymer electrolyte membrane 18 in the embodiments described below) and a pair of electrodes (for instance, a cathode 25 and an anode 27 in the embodiments described below) located at both sides of the solid polymer electrolyte membrane, and a pair of separators (for instance, a cathode side separator 14 and an anode side separator 16 in the embodiments described below) which hold the membrane electrode assembly, obtained by the process comprising the steps of: applying liquid sealant to at least one of a marginal portion (for instance, a marginal portion 18a in the embodiments described below) of the solid polymer electrolyte membrane, the marginal portion being not covered by the pair of electrodes when assembled, and a surface (for instance, a groove portion 28 in the embodiments described below) of each of the pair of separators, the surface corresponding to the marginal portion of the solid polymer electrolyte membrane; holding the solid polymer electrolyte membrane with the pair of separators to perform temporary assembling; solidifying the liquid sealant while maintaining a temporary assembling state (i.e., steps shown in, for instance, FIGS. 3 through 6 in the embodiments described below) to obtain a fuel cell unit; stacking a predetermined number of the fuel cell units so as to be placed between a pair of end plates (for instance, end plates 90 in the embodiments described below), and applying a compression load in a direction reducing the distance between the end plates to produce a fuel cell stack (i.e., steps shown in, for instance, FIGS. 7 through 9 in the embodiments described below).

BRIEF DESCRIPTION OF THE DRAWINGS

Some of the features and advantages of the invention have been described, and others will become apparent from the detailed description which follows and from the accompanying drawings, in which:

FIG. 12 is a graph showing the relationship between the non-uniformity in thickness of the membrane electrode assembly of the conventional fuel cell stack and the seal compression amount and the seal load.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Figure 1:
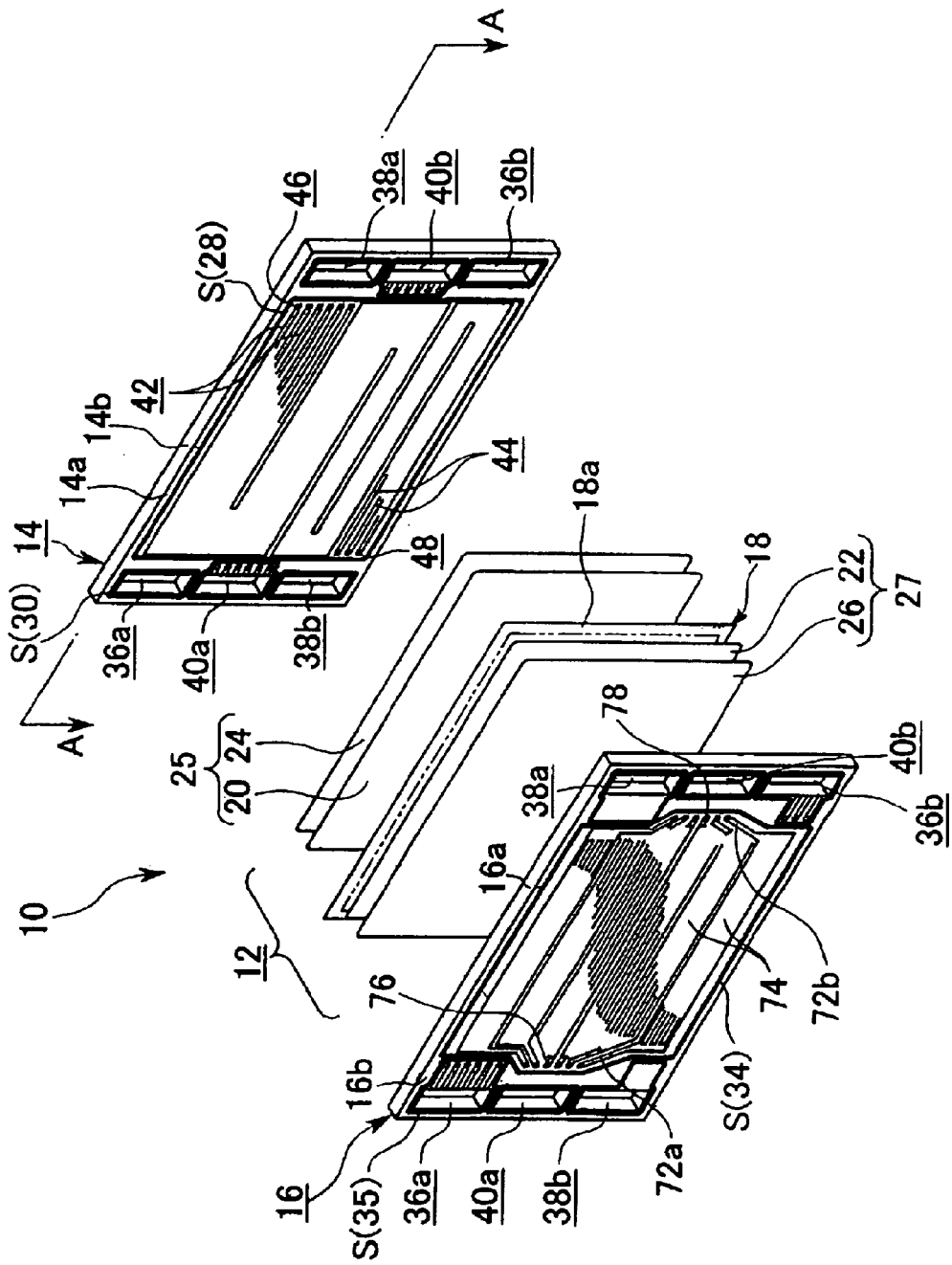
FIG. 1 is a diagram showing an exploded perspective view of a fuel cell unit manufactured by using a method according to an embodiment of the present invention.

FIG. 1 is a diagram showing an exploded perspective view of a fuel cell unit manufactured by a method in accordance with the first embodiment of the present invention.

The fuel cell unit 10 includes a membrane electrode assembly 12, and a cathode side separator 14 and an anode side separator 16, which hold the membrane electrode assembly 12. A plurality of the fuel cell units 10 may be stacked to produce, for example, a fuel cell stack used for a vehicle.

The membrane electrode assembly 12 includes a solid polymer electrolyte membrane 18, and a cathode side catalytic layer 20 and an anode side catalytic layer 22 which are disposed so as to sandwich the solid polymer electrolyte membrane 18. Also, a cathode side gas diffusion layer 24 and an anode side gas diffusion layer 26 are disposed outside of the cathode side catalytic layer 20 and the anode side catalytic layer 22, respectively.

The cathode side catalytic layer 20 together with the cathode side gas diffusion layer 24 forms a cathode 25. Similarly, the anode side catalytic layer 22 together with the anode side gas diffusion layer 26 forms an anode 27.

As shown in FIG. 1, the solid polymer electrolyte membrane 18 has a marginal portion 18a, i.e., an area outside of the two-dotted line in the solid polymer membrane portion 18a, i.e., an area outside of the two-dotted line in the solid polymer membrane anode side catalytic layer 22 when disposed so as to sandwich the solid polymer electrolyte membrane 18.

A liquid sealant S, which is applied to the outer peripheral portion of the cathode side separator 14 and that of the anode side separator 16, makes direct contact with a side (i.e., a surface) of the marginal portion 18a. The liquid sealant S will be with a side (i.e., a surface) of the marginal portion 18a. The liquid sealant S will be The cathode side separator 14, as shown in FIG. 1, includes an inlet side fuel gas opening 36a for allowing a fuel gas, such as a gas containing hydrogen, to pass through, at the upper left end close to the edge thereof, and an inlet side oxidant gas opening 38a for allowing an oxidant gas, such as a gas containing oxygen, or air, to pass through, at the upper right end close to the edge thereof.

Also, the cathode side separator 14 includes an inlet side cooling medium opening 40a which allows a cooling medium, such as pure water, ethylene glycol, or oil, to pass through at the left end at the middle in the vertical direction, and an outlet side cooling medium opening 40b which allows the used cooling medium to pass through at the right end at the middle in the vertical direction.

Moreover, the cathode side separator 14 includes an outlet side fuel gas opening 36b for allowing the fuel gas to pass through at the lower right end close to the edge thereof, and an outlet side oxidant gas opening 38b for allowing the oxidant gas to pass through at the lower left end close to the edge thereof. In this embodiment, the outlet side fuel gas opening 36b and the outlet side oxidant gas opening 38b are disposed so as to be diagonal with respect to the inlet side fuel gas opening 36a and the inlet side oxidant gas opening 38a, respectively.

As shown in FIG. 1, a plurality of independent first oxidant gas channels 42 are formed on a surface 14a of the cathode side separator 14 opposite the cathode side catalytic layer 20. The first oxidant gas channels 42 start in the vicinity of the inlet side oxidant gas opening 38a, and run horizontally while meandering downward in the direction of gravity.

The first oxidant gas channels 42 merge into a plurality of second oxidant gas channels 44, and the second oxidant gas channels 44 end in the vicinity of the outlet side oxidant gas opening 38b.

The cathode side separator 14 includes first oxidant gas connecting passages 46 which passes through the cathode side separator 14, whose ends are connected to the inlet side oxidant gas opening 38a on a surface 14b opposite the surface 14a, and whose other ends are connected to the first oxidant gas channels 42 on the surface 14a. Also, the cathode side separator 14 includes second oxidant gas connecting passages 48 which passes through the cathode side separator 14, whose ends are connected to the outlet side oxidant gas opening 38b on the surface 14b, and whose other ends are connected to the second oxidant gas channels 44 on the surface 14a.

In addition, the anode side separator 16 also includes an inlet side fuel gas opening 36a, an inlet side oxidant gas opening 38a, an inlet side cooling medium opening 40a, an outlet side cooling medium opening 40b, an outlet side fuel gas opening 36b, and an outlet side oxidant gas opening 38b, at both ends close to the edges thereof, in a manner similar to the cathode side separator 14.

Figure 2:
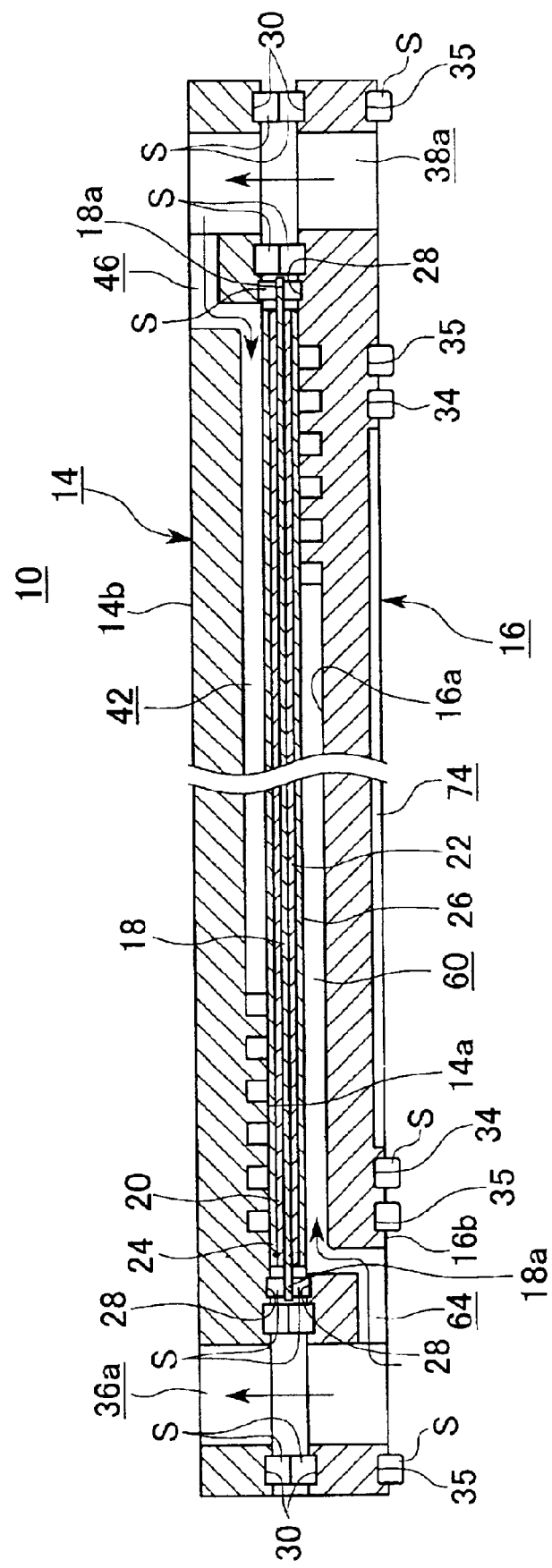
FIG. 2 is a cross-sectional view of the fuel cell unit shown in FIG. 1 cut along the line A—A.

As shown in FIG. 2, a plurality of independent first fuel gas channels 60 are formed on a surface 16a of the anode side separator 16 in the vicinity of the inlet side fuel gas opening 36a.

The first fuel gas channels 60 run horizontally while meandering downward in the direction of gravity, and merge into three second fuel gas channels (not shown in the figure). The second fuel gas channels end in the vicinity of the outlet side fuel gas opening 36b.

The anode side separator 16 includes first fuel gas connecting passages 64 which connect the inlet side fuel gas opening 36a on the surface 16b to the first fuel gas channels 60, and second fuel gas connecting passages (not shown in the figure) which connect the outlet side fuel gas opening 36b on the surface 16b to the second fuel gas channels 62. The first fuel gas connecting passages 64 and the second fuel gas connecting passages are formed so as to pass through the anode side separator 16.

A plurality of main channels 72a and 72b which function as cooling medium channels are formed on the surface 16b of the anode side separator 16, within the area enclosed by the liquid sealant S, which will be described later, and close to the inlet side cooling medium opening 40a and the outlet side cooling medium opening 40b.

Also, a plurality of branch channels 74 branch off from the main channels 72a and 72b are disposed so as to extend in the horizontal direction.

The anode side separator 16 includes first cooling medium connecting passages 76 which connect the inlet side cooling medium opening 40a to the main channels 72a, and second cooling medium connecting passages 78 which connect the outlet side cooling medium opening 40b to the main channels 72b. The first cooling medium connecting passages 76 and the second cooling medium connecting passages 78 pass through the anode side separator 16.

In this embodiment, a groove portion 28 is formed on the surface 16a of the anode side separator 16a (i.e., an area of the separator 16a corresponding to the marginal portion 18a), which holds the solid polymer electrolyte membrane 18, opposite the anode side catalytic layer 22 at a position corresponding to the marginal portion 18a of the solid polymer electrolyte membrane 18. The liquid sealant S is applied to the groove portion 28.

Also, a groove portion 30 is formed around each of the inlet side fuel gas opening 36a, the inlet side oxidant gas opening 38a, the inlet side cooling medium opening 40a, the outlet side cooling medium opening 40b, the outlet side fuel gas opening 36b, and the outlet side oxidant gas opening 38b, which are formed on the surface 16a of the separator 16. The liquid sealant S is also applied to the groove portion 30.

Moreover, the groove portions 28 and 30 are formed on the surface 14a of the cathode side separator 14, which holds the membrane electrode assembly 12 together with the anode side separator 16, opposite the cathode side catalytic layer 20, at a position corresponding to the groove portions 28 and 30, respectively, on the surface 16a of the anode side separator 16. The liquid sealant S is also applied to each of the groove portions 28 and 30.

Accordingly, as shown in FIG. 2, the liquid sealant S applied to the groove portions 28 and 30 on the cathode side separator 14 and the anode side separator 16 which hold the membrane electrode assembly 12, respectively, seal around the membrane electrode assembly 12 by directly contacting with the marginal portion 18a at positions sandwiching the marginal portion 18a as for the liquid sealant S used for the groove portion 28, and seal around the openings 36a, 36b, 38a, 38b, 40a, and 40b by directly contacting with each other as for the liquid sealant S used for the groove portion 30.

A groove portion 34 which surrounds the branch channels 74 is formed on the surface 16b of the anode side separator 16 at a position opposite the surface 14b of the cathode side separator 14 when a plurality of the fuel cell units 10 are stacked. The liquid sealant S is also applied to the groove portion 34.

Also, a groove portion 35 is formed around each of the inlet side fuel gas opening 36a, the inlet side oxidant gas opening 38a, the inlet side cooling medium opening 40a, the outlet side cooling medium opening 40b, the outlet side fuel gas opening 36b, and the outlet side oxidant gas opening 38b on the surface 16b of the anode side separator 16. The liquid sealant S is also applied to the groove portion 35.

The groove portions 35 around the inlet side fuel gas opening 36a and the outlet side fuel gas opening 36b are formed so as to surround the first fuel gas connecting passage 64 and the second fuel gas connecting passage, respectively.

Also, the groove portions 35 around the inlet side oxidant gas opening 38a and the outlet side oxidant gas opening 38b are formed so as to surround the inlet side oxidant gas opening 38a and the outlet side oxidant gas opening 38b, respectively, on the surface 14b of the cathode side separator 14.

Accordingly, when the fuel cell units 10 are stacked and the surface 14b of the cathode side separator 14 contacts the surface 16b of the anode side separator 16, the liquid sealant S of the anode side separator 16 arranged around the inlet side fuel gas opening 36a, the inlet side oxidant gas opening 38a, the inlet side cooling medium opening 40a, the outlet side cooling medium opening 40b, the outlet side fuel gas opening 36b, the outlet side oxidant gas opening 38b, and the branch channels 74 are in contact with the surface 14b of the cathode side separator 14, thereby ensuring water-tightness between the cathode side separator 14 and the anode side separator 16.

In this embodiment, the above-mentioned liquid sealant S may be made of a thermosetting type fluoride material or a thermosetting type silicone, and has a viscosity of a certain degree by which the cross-sectional shape thereof will not change in an applied state, and be cured (or solidified) after the application while maintaining a certain degree of elasticity. In addition, the liquid sealant S is made of a material which is capable of absorbing dimensional errors at sealing portions, i.e., non-uniformity in the thickness HMEA of the membrane electrode assembly 12 and in the thickness of the cathode side and the anode side separators 14 and 16, by being squeezed in the groove portions 28, 30, 34, and 35 after the application, and makes uniform the compression amount in a load applied state after being cured.

Next, main steps of a method for manufacturing the fuel cell unit 10 having the above-mentioned structure, and a method for manufacturing a fuel cell stack which is produced by stacking a plurality of the fuel cell units 10 according to an embodiment of the present invention will be described with reference to FIGS. 3 through 9.

Figure 3:
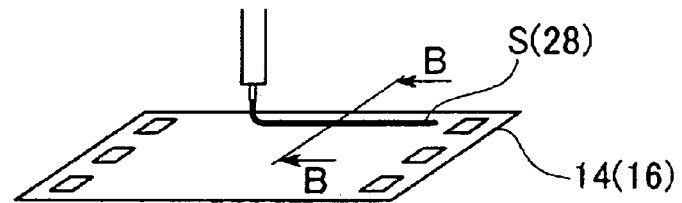
FIG. 3 is a diagram showing a part of the process, i.e., liquid sealant is applied to a separator, of the method for producing fuel cell units according to the embodiment of the present invention.

First, the cathode side separator 14 and the anode side separator 16 having the above-mentioned configuration are prepared, and the liquid sealant S is applied to each of the groove portions 28 and 30 formed on the separators 14 and 16 (refer to FIG. 3).

Figure 4:
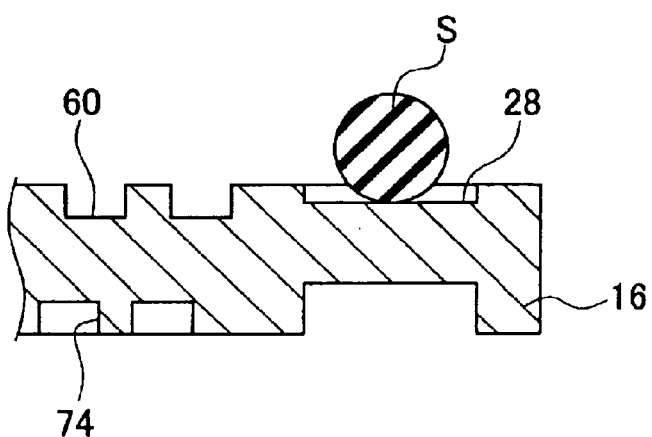
FIG. 4 is a cross-sectional view of the fuel cell unit shown in FIG. 3 cut along the line B—B.

Note that the cross-sectional shape of the liquid sealant S applied is substantially circular as shown in FIG. 4 and this shape is maintained.

Figure 5:
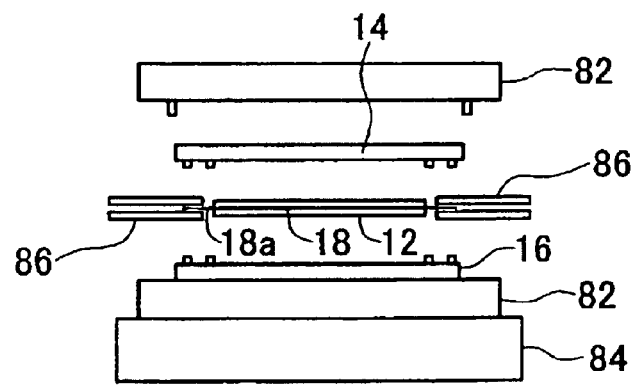
FIG. 5 is a diagram showing a part of the process, i.e., temporary assembly is carried out by holding both sides of a membrane electrode assembly by a pair of separators, of the method for producing fuel cell units according to the embodiment of the present invention.

Next, the membrane electrode assembly 12 constructed in advance is prepared and the membrane electrode assembly 12 is disposed between the cathode side separator 14 and the anode side separator 16, and then placed between a compression jig 82 as shown in FIG. 5.

In FIG. 5, the numeral 86 indicates supporting jigs which support the outer periphery portion of the membrane electrode assembly 12 while positioning the membrane electrode assembly 12 with respect to the cathode side and anode side separators 14 and 16 in the in-plane direction.

After this, a temporary assembly of a fuel cell is carried out by closing an upper and a lower part of the compression jig 82 to hold the membrane electrode assembly 12 by the cathode side and the anode side separators 14 and 16 so that the liquid sealant S applied to the groove portions 28 on both separators 14 and 16 makes direct contact to the marginal portion 18a of the solid polymer electrolyte membrane 18 at a position the marginal portion 18a of the solid polymer electrolyte membrane 18 at a position direct contact with each other.

The term temporary assembly means an assembly of a fuel cell to reach a state in which a low degree of load is applied thereon so that the thickness HMEA of the membrane electrode assembly 12 is made uniform in the in-plane direction.

During the temporary assembly, the liquid sealant S is squeezed in the groove portions 28 and 30, and absorbs errors in the sealing portions, i.e., the non-uniformity in thickness HMEA of the membrane electrode assembly 12 and in the thickness of the cathode side and anode side separators 14 and 16.

In this manner, the compression amount, i.e., the tightening margin, of the liquid sealant S at each of the sealing portions is made uniform over the entire fuel cell stack even when compressed in the stacking direction by using bolts 92 after the fuel cell units are stacked. This will be described later.

After this, the temporary assembly in which the membrane electrode assembly 12 is sandwiched by the cathode side and the anode side separators 14 and 16, is heated together with the compression jig 82 in an oven so that the liquid sealant S is cured while the above-mentioned load is applied thereto.

Figure 6:
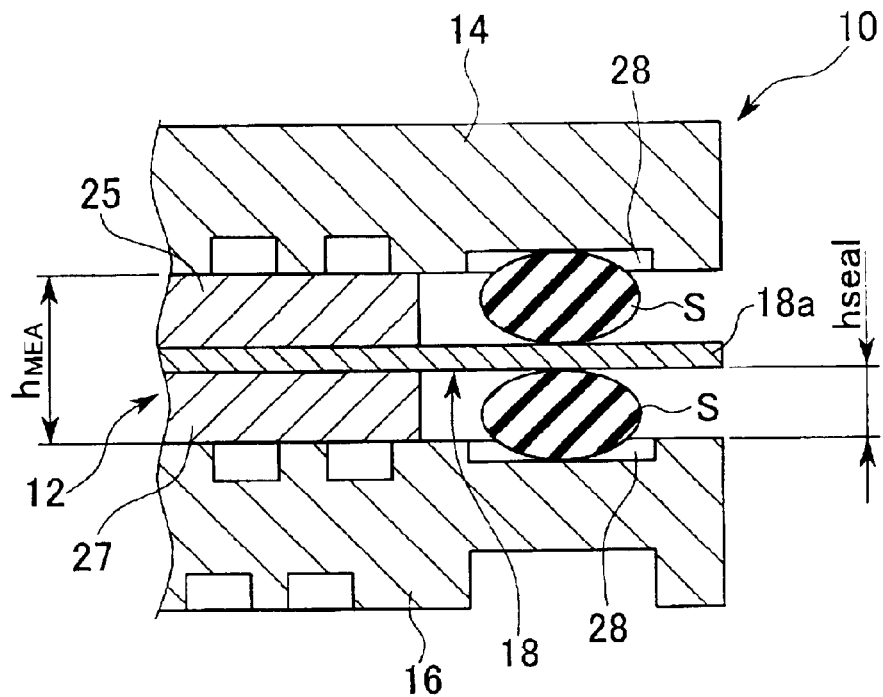
FIG. 6 is a diagram showing an enlarged cross-sectional view of main portions of a fuel cell unit which is formed by curing the liquid sealant after the temporary assembly shown in FIG. 5.
Figure 7:
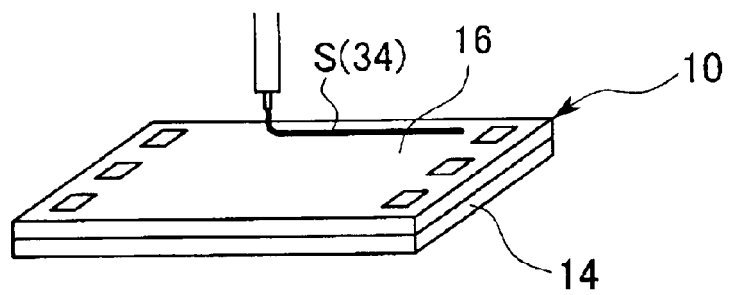
FIG. 7 is a diagram showing a part of the process, i.e., liquid sealant is applied to one of the separators, of the method for producing fuel cell units according to the embodiment of the present invention.

After the compression jig 82 is separated from the temporary assembly and the assembly is cooled, a fuel cell unit 10 having the above-mentioned configuration and constant tightening margin of the liquid sealant S is obtained even if the thickness of the membrane electrode assembly 12 is not uniform in the in-plane direction (refer to FIG. 6).

Figure 8:
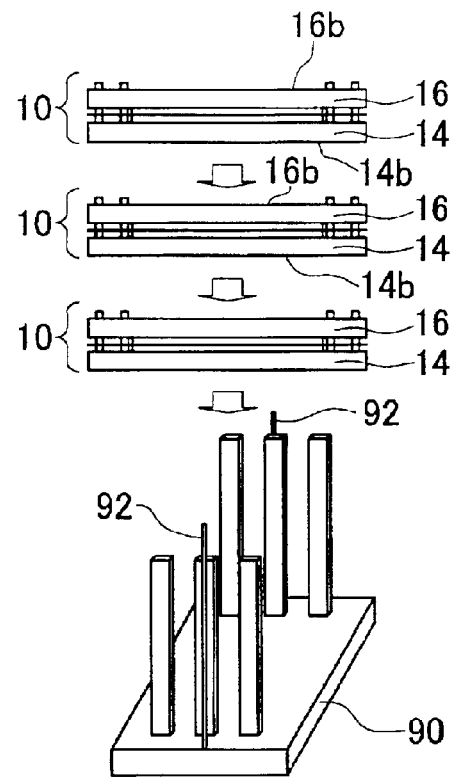
FIG. 8 is a diagram showing a part of the process, i.e., a plurality of the fuel cell units are stacked, of the method for producing fuel cell units according to the embodiment of the present invention.

Then, the liquid sealant S is applied to the groove portions 34 and 35 formed on the surface 16b of the anode side separator 16 of the fuel cell unit 10 obtained by the procedure explained above (refer to FIG. 7), and a process is repeated in which the surface 14b of the cathode side separator 14 of another fuel cell unit 10 also obtained via the above procedure is placed on the surface 16b so that the fuel cell units 10 are sequentially stacked on an end plate 90 (refer to FIG. 8).

After a predetermined number of the fuel cell units 10 are stacked, another end plate (not shown in the figure) is placed on top and the plates are tightened by using the bolts 92 to produce a fuel cell stack.

More specifically, when the end plates are tightened by using the bolts 92, a compression load is applied in the stacking direction, i.e., the direction reducing the distance between the end plates 90. Accordingly, surface pressure which is sufficient for suppressing the increase in the internal resistance of the contact resistance is generated at each of the stacking surfaces in and between the fuel cell units 10.

Figure 9:
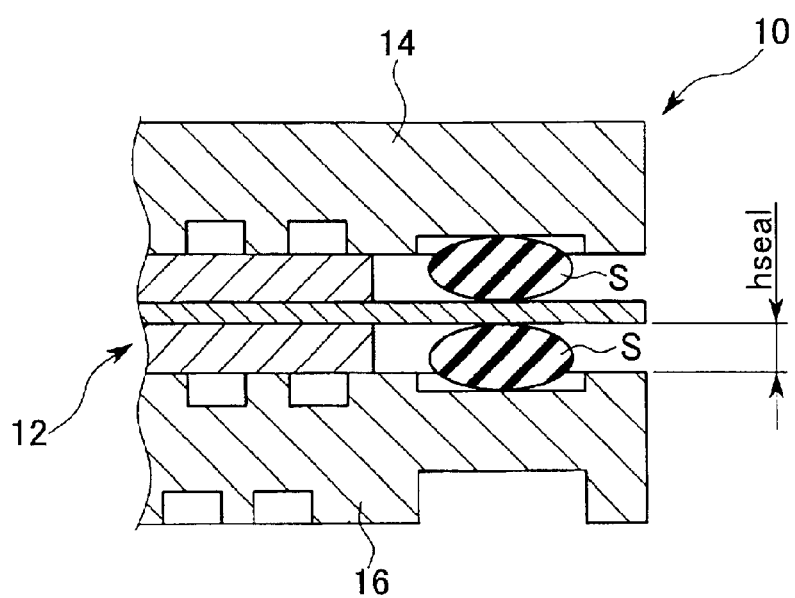
FIG. 9 is a diagram showing an enlarged cross-sectional view of main portions of a fuel cell stack which is manufactured by tightening the stacked structure shown in FIG. 8 by using bolts so as to shorten the distance between the end plates.

During that time, the liquid sealant S in the groove portions 28, 30, 34, and 35 are squeezed, and the seal compression amount $\Delta h$ at each sealing portion is made constant regardless of the non-uniformity in thickness hMEA of the membrane electrode assembly 12 and in the thickness of the cathode side and the anode side separators 14 and 16 (refer to FIG. 9).

Figure 10:
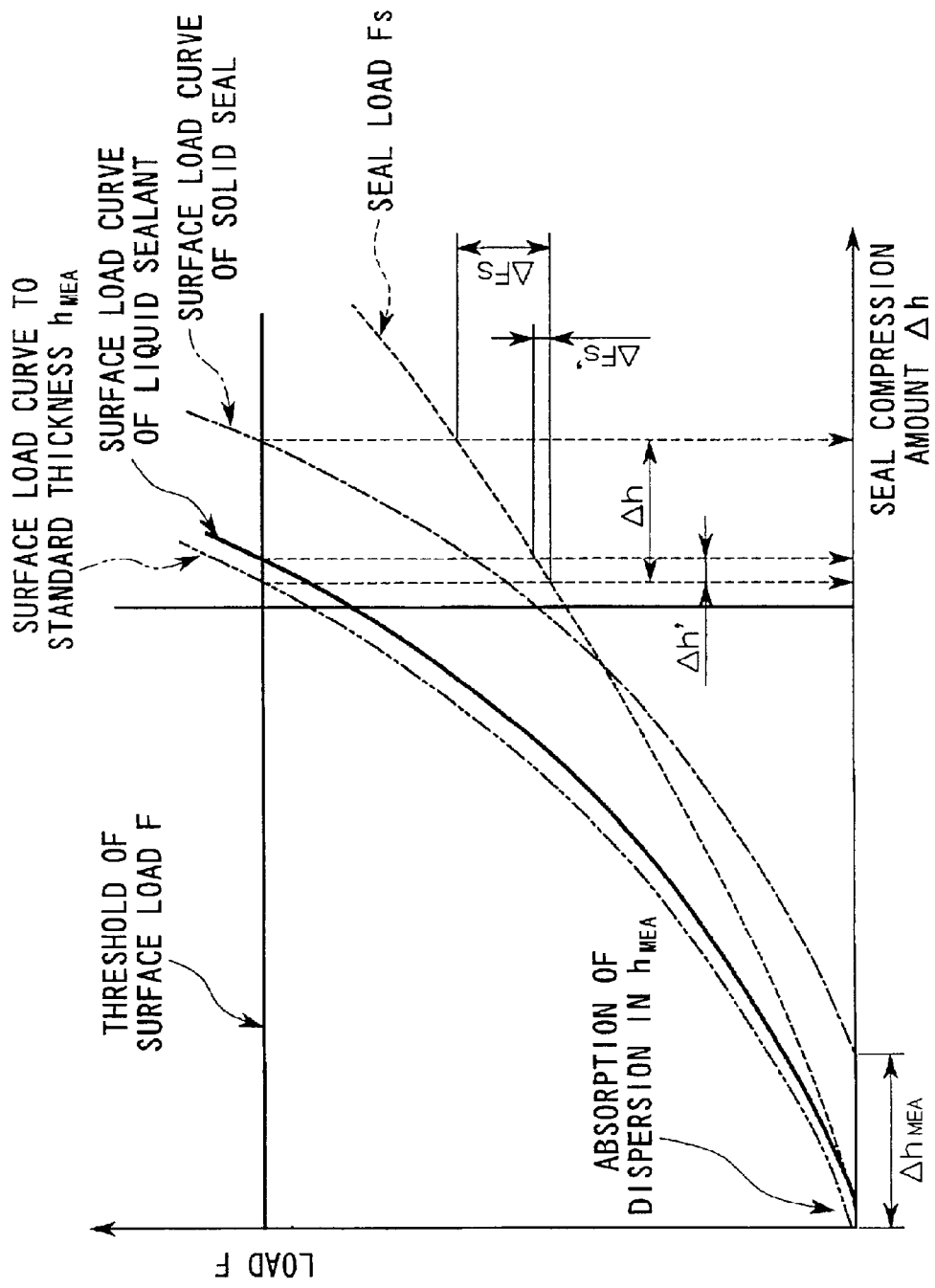
FIG. 10 is a graph showing the relationship between the non-uniformity in thickness of the membrane electrode assembly and the seal compression amount and the seal load by comparing a fuel cell stack manufactured by the method according to the embodiment of the present invention with a conventional fuel cell stack using a solid seal.
Figure 11:
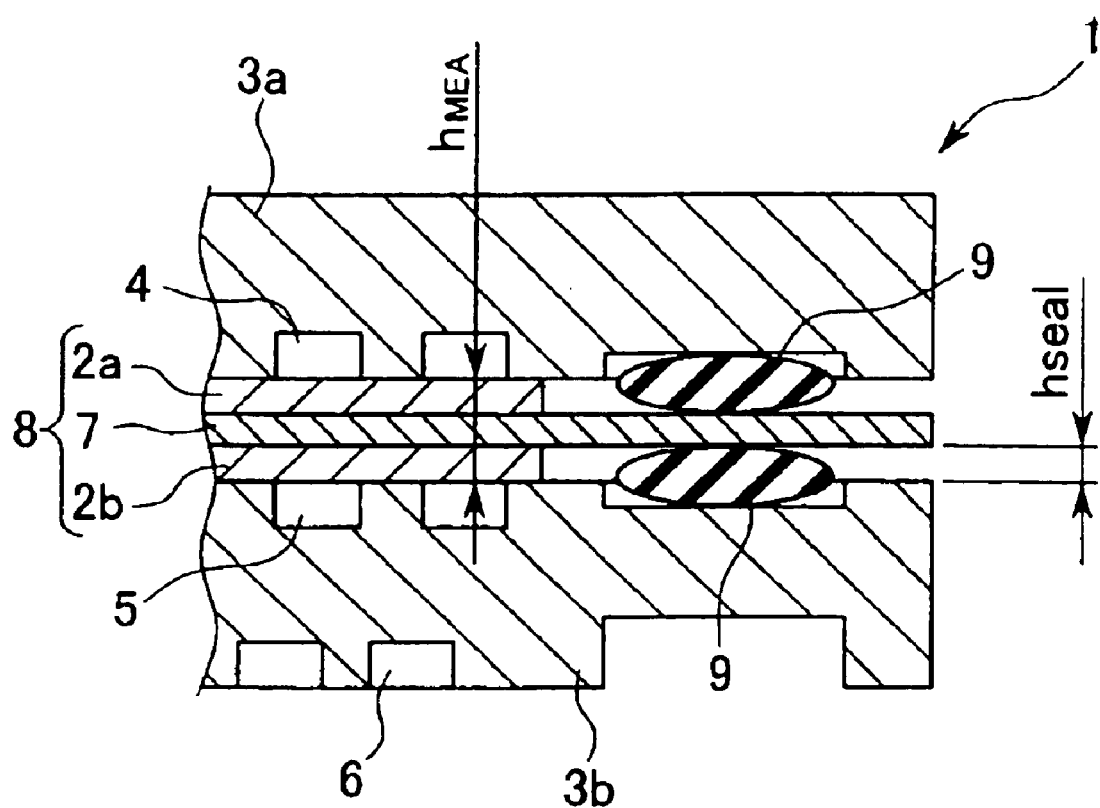
FIG. 11 is a diagram showing an enlarged cross-sectional view of main portions of the conventional fuel cell stack.

That is, as shown in FIG. 10, when the thickness hMEA of the membrane electrode assembly 12 differs by $\Delta$hMEA with respect to the standard thickness hMEA, the non-uniformity $\Delta$hMEA of the thickness hMEA is directly reflected on the seal compression amount $\Delta h$ if a solid seal is used as in conventional techniques. However, when liquid sealant S is used as in the embodiments of the present invention, the non-uniformity $\Delta$hMEA is not reflected on the seal compression amount $\Delta h'$ since the non-uniformity $\Delta$hMEA is absorbed during the temporary assembly. Accordingly, the tightening margins are made constant according to the embodiments of the present invention.

In this manner, as shown in the graph in FIG. 10, the non-uniformity A Fs' of the seal load Fs (expressed by a dashed line in the graph), which may be expressed by the distance between points of intersection, which are present on the threshold value of a surface load F of the membrane electrode assembly 12 required for obtaining the above-mentioned degree of the seal surface pressure, formed by the surface load curve (expressed by a two-dotted line in the graph) of the membrane electrode assembly 12 having a standard thickness hMEA, and by the surface load curve (expressed by a solid line in the graph) of the membrane electrode assembly 8 having a thickness hMEA which is different from the standard thickness by ΔhMEA, can be significantly reduced as compared with the non-uniformity ΔFs obtained when a solid seal is used as in conventional techniques.

As explained above, by using the methods for producing fuel cell units 10 and for producing fuel cell stacks according to the embodiments of the present invention, the seal surface pressure acting on sealing portions is made uniform and an excellent sealing property is maintained due to excellent follow-up of the liquid sealant S for the dimensional errors. Accordingly, it becomes possible to produce the fuel cell unit 10 and the fuel cell stack which are capable of exerting a desired power generation property.

Also, according to the present invention, since a strict control of the dimension, especially in the thickness direction, becomes unnecessary for the membrane electrode assembly 12, and the cathode side and the anode side separators 14 and 16 due to the excellent follow-up property of the liquid sealant S as mentioned above, it becomes possible to significantly reduce the manufacturing cost.

Moreover, since the surface load between the fuel cell units 10 is made constant, the thickness of each of the separators 14 and 16 may be decreased. Accordingly, the size and weight of the fuel cell unit 10 and the fuel cell stack can be reduced, and a fuel cell stack which is especially suitable for a vehicle in which the size of available space is restricted and the thickness of each of the separators 14 and 16 must be minimized as much as possible, can be produced.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A method for producing a fuel cell unit including a membrane electrode assembly formed by a solid polymer electrolyte membrane and a pair of electrodes located at both sides of the solid polymer electrolyte membrane, and a pair of separators which hold the membrane electrode assembly, comprising the steps of:

applying liquid sealant to at least one of a marginal portion of the solid polymer electrolyte membrane, said marginal portion being not covered by the pair of electrodes when assembled, and a surface of each of the pair of separators, said surface corresponding to the marginal portion of the solid polymer electrolyte membrane;

holding the solid polymer electrolyte membrane with the pair of separators to perform temporary assembling; and solidifying the liquid sealant while maintaining a temporary assembling state.

2. A method for producing a fuel cell unit according to claim 1, wherein said liquid sealant is also applied to at least one of an outer periphery of said membrane electrode assembly, in the vicinity of a communication-hole which penetrates through said separator, and an outer periphery of a cooling medium passage of said separators.

3. A method for producing a fuel cell unit according to claim 1, wherein said liquid sealant is applied to at least one of groove portions formed on said separators.

4. A method for producing a fuel cell unit according to claim 1, wherein said liquid sealant is made of a thermosetting type fluoride material or a thermosetting type silicone.

5. A method for producing a fuel cell unit according to claim 1, wherein a cross-sectional shape of said liquid sealant applied is substantially circular.

6. A method for producing a fuel cell stack having a plurality of stacked fuel cell units including a membrane electrode assembly formed by a solid polymer electrolyte membrane and a pair of electrodes located at both sides of the solid polymer electrolyte membrane, and a pair of separators which hold the membrane electrode assembly, comprising the steps of:

applying liquid sealant to at least one of a marginal portion of the solid polymer electrolyte membrane, said marginal portion being not covered by the pair of electrodes when assembled, and a surface of each of the pair of separators, said surface corresponding to the marginal portion of the solid polymer electrolyte membrane;

holding the solid polymer electrolyte membrane with the pair of separators to perform temporary assembling;

solidifying the liquid sealant while maintaining a temporary assembling state to obtain a fuel cell unit;

stacking a predetermined number of the fuel cell units so as to be placed between a pair of end plates, and applying a compression load in a direction reducing the distance between the end plates to produce a fuel cell stack.

7. A method for producing a fuel cell stack according to claim 6, wherein said liquid sealant is also applied to at least one of an outer periphery of said membrane electrode assembly, in the vicinity of a communication-hole which penetrates through said separator, and an outer periphery of a cooling medium passage of said separators.

8. A method for producing a fuel cell stack according to claim 6, wherein said liquid sealant is applied to at least one of groove portions formed on said separators.

9. A method for producing a fuel cell stack according to claim 6, wherein said liquid sealant is made of a thermosetting type fluoride material or a thermosetting type silicone.

10. A method for producing a fuel cell stack according to claim 6, wherein a cross-sectional shape of said liquid sealant applied is substantially circular.

11. A fuel cell unit including a membrane electrode assembly formed by a solid polymer electrolyte membrane and a pair of electrodes located at both sides of the solid polymer electrolyte membrane, and a pair of separators which hold the membrane electrode assembly, obtained by the process comprising the steps of:

applying liquid sealant to at least one of a marginal portion of the solid polymer electrolyte membrane, said marginal portion being not covered by the pair of electrodes when assembled, and a surface of each of the pair of separators, said surface corresponding to the marginal portion of the solid polymer electrolyte membrane;

holding the solid polymer electrolyte membrane with the pair of separators to perform temporary assembling; and solidifying the liquid sealant while maintaining a temporary assembling state.

12. A fuel cell unit according to claim 11, wherein said liquid sealant is also applied to at least one of an outer periphery of said membrane electrode assembly, in the vicinity of a communication-hole which penetrates through said separator, and an outer periphery of a cooling medium passage of said separators.

13. A fuel cell unit according to claim 11, wherein said liquid sealant is applied to at least one of groove portions formed on said separators.

14. A fuel cell unit according to claim 11, wherein said liquid sealant is made of a thermosetting type fluoride material or a thermosetting type silicone.

15. A fuel cell unit according to claim 11, wherein a cross-sectional shape of said liquid sealant applied is substantially circular.

16. A fuel cell stack having a plurality of stacked fuel cell units including a membrane electrode assembly formed by a solid polymer electrolyte membrane and a pair of electrodes located at both sides of the solid polymer electrolyte membrane, and a pair of separators which hold the membrane electrode assembly, obtained by the process comprising the steps of:

applying liquid sealant to at least one of a marginal portion of the solid polymer electrolyte membrane, said marginal portion being not covered by the pair of electrodes when assembled, and a surface of each of the pair of separators, said surface corresponding to the marginal portion of the solid polymer electrolyte membrane;

holding the solid polymer electrolyte membrane with the pair of separators to perform temporary assembling;

solidifying the liquid sealant while maintaining a temporary assembling state to obtain a fuel cell unit;

stacking a predetermined number of the fuel cell units so as to be placed between a pair of end plates, and applying a compression load in a direction reducing the distance between the end plates to produce a fuel cell stack.

17. A fuel cell stack according to claim 16, wherein said liquid sealant is also applied to at least one of an outer periphery of said membrane electrode assembly, in the vicinity of a communication-hole which penetrates through said separator, and an outer periphery of a cooling medium passage of said separators.

18. A fuel cell stack according to claim 16, wherein said liquid sealant is applied to at least one of groove portions formed on said separators.

19. A fuel cell stack according to claim 16, wherein said liquid sealant is made of a thermosetting type fluoride material or a thermosetting type silicone.

20. A fuel cell stack according to claim 16, wherein a cross-sectional shape of said liquid sealant applied is substantially circular.

* * * * *